Patented Feb. 9, 1943

2,310,479

UNITED STATES PATENT OFFICE 2,310,479

VITAMIN PREPARATION FOR PARENTERAL ADMINISTRATION

Hermann Vollmer, New York, N. Y.

No Drawing. Application April 21, 1941, Serial No. 389,604

15 Claims. (Cl. 167—81)

My present invention relates to a new medicine for parenteral administration and to a new composition of matter to be used as this medicine. Herein, the term "parenteral administration" is used as referring to subcutaneous and intramuscular injections.

This application is a continuation in part of my copending application Serial 297,107, filed September 29, 1939 for Vitamin preparation for parenteral administration.

It has been found that vitamin injections administered in oily solution are slowly adsorbed, whereas in most cases a quick adsorption and action is desired.

The speed of absorption of vitamin in oily solution which is injected intramuscularly depends chiefly on the extent of surface contact between the oily vehicle and the tissue, and the solubility of the vitamin in the tissue.

It is an object of my present invention to increase the extent of surface contact between the oily vehicle and the tissue. It is a further object of my invention to increase the solubility of the vitamin in the tissue.

In order to increase the surface contact I add to the vitamin in oily solution a substance adapted to reduce the viscosity of the oily vehicle. It is further of advantage if the substance added is a better solvent for the vitamin administered than the oily vehicle containing the vitamin.

The present invention may be applied to various oil or fat soluble vitamins such for example as vitamins A, D, E and K. These vitamins all have the property of losing their potency by oxidation, hence a solvent must be used which does not promote oxidation of the vitamin.

As a solvent for the above vitamins various vegetable oils may be used, such for example as peanut oil, olive oil, linseed oil, wheat germ oil, cotton seed oil, rice oil and palm oil. In general, all fatty oils of animal or vegetable origin which are chemically triglycerides of fatty acids may be used. I prefer peanut oil as a carrier and solvent for the vitamin because it is less irritating and causes fewer allergic reactions than other vegetable oils.

For increasing the surface contact of the oil and reducing the viscosity thereof, I propose to incorporate therewith a suitable agent which is preferably also a solvent for the vitamin, for example, ether, pentan, chloroform, aceton, referred to herein for convenience as ether like substances.

The above materials, when used in relatively small amounts, decrease the viscosity of the oil. This lowering of the viscosity is not in direct ratio to the amount of the substance used but follows a hyperbolic curve. Relatively small amounts of the above substances therefore reduce the viscosity of the oil to a small fraction of its original value, and the resultant mixture spreads immediately after its injection and forms a large contact surface with the tissues, thereby increasing the interstices of the muscles which come in contact with the vitamin. Since the vitamins are more soluble in said ether like substances than in oil, the vitamins are carried thereby to the cell sterols and fats where the vitamin is absorbed much more rapidly than in the case of an oil solution alone. Certain oils for example may remain in situ for many months without appreciable absorption.

As a specific example I propose to carry out the administration of the vitamin in a mixture consisting of about 50% to 70% of a vegetable oil and about 50% to 30% or less of a viscosity lowering substance of the type specified above.

I have found for example that rickets and tetany can be cured by administration of one single dose of about 600,000 units of vitamin D. The speed of the curative effect of this "shock therapy" depends largely on the rapidity of absorption of the vitamin D administered. Therefore I propose especially for this therapy the addition of a substance of the class referred to above which is adapted to reduce the viscosity of the oil and is a better solvent for this massive dose of vitamin D than the oily vehicle.

I prefer thereby to use for this "shock therapy" a composition of matter containing in one dose more than 500,000 units of vitamin D, 0.5 to 0.7 cubic centimeter of vegetable oil, and 0.5 to 0.3 cubic centimeter of ether. Repeated doses of 100,000 units or more may however be used if desired.

The following composition was found suitable for intramuscular injection:

Vitamin D _____units__ 600,000
Peanut oil_____cubic centimeters___ 0.6
Ether _____centimeters___ 0.4

This mixture is thin enough to pass through hypodermic needles. Consequently, the intramuscular injection causes little or no pain, an additional clinical advantage. Probably due to the germicidal effect of ether, the solution was found to be sterile without sterilization by heat, and therefore it may be used without heat sterilization.

Without further analysis, the foregoing will so fully reveal the gist of this invention that others can by applying current knowledge readily adapt it for various applications without omitting certain features, that, from the standpoint of the prior art, fairly constitute essential characteristics of the present invention, and therefore such adaptations should and are intended to be comprehended within the meaning and range of equivalency of the following claims.

What is claimed is:

1. A therapeutic agent for parenteral administration comprising, a composition of matter containing vitamin D, a vegetable oil, and ether in an amount less than 50% and suited to accelerate the spreading of the mixture after injection to form rapidly a large contact surface between the viatmin-containing oil and the tissues, thereby increasing the speed of absorption of the vitamin by said tissues.

2. A therapeutic agent for parenteral administration comprising, a composition of matter containing vitamin D, peanut oil, and ether in an amount less than 50% and suited to accelerate the spreading of the mixture after injection to form rapidly a large contact surface between the vitamin-containing oil and the tissues, thereby increasing the speed of absorption of the vitamin by said tissues.

3. A therapeutic agent for parenteral administration comprising, a composition of matter consisting of vitamin D in a mixture consisting of about 50 to 70 percent of a vegetable oil and about 50 to 30 percent of ether.

4. A therapeutic agent for parenteral administration comprising, a composition of matter consisting of vitamin D in a mixture consisting of about 50 to 70 percent of peanut oil and about 50 to 30 percent of ether.

5. A therapeutic agent for parenteral administration comprising, a composition of matter containing in one dose more than 500,000 units of vitamin D, 0.5 to 0.7 cubic centimeter of a vegetable oil, and 0.5 to 0.3 cubic centimeter of ether.

6. A therapeutic agent for parenteral administration comprising, a composition of matter containing in one dose about 500,000 units of vitamin D, about 0.6 cubic centimeter of peanut oil, and about 0.4 cubic centimeter of ether.

7. A therapeutic agent for parenteral administration comprising a composition of matter containing in one dose more than 100,000 units of vitamin D, 0.5 to 0.7 cubic centimeter of a vegetable oil, and 0.5 to 0.3 cubic centimeter of ether.

8. A therapeutic agent for parenteral administration, comprising a vitamin selected from the group consisting of vitamins A, D, E and K, a vegetable oil, and an amount, less than 50% and suited to accelerate the spreading of the mixture after injection to form rapidly a large contact surface between the vitamin containing oil and the tissues, of a substance selected from the group consisting of ether, pentan, chloroform and aceton.

9. A therapeutic agent for parenteral administration, comprising a vitamin selected from the group consisting of vitamins A, D, E and K, peanut oil, and an amount, less than 50% and suited to accelerate the spreading of the mixture after injection to form rapidly a large contact surface between the vitamin containing oil and the tissues, of a substance selected from the group consisting of ether, pentan, chloroform and aceton.

10. A therapeutic agent for parenteral administration, comprising a vitamin selected from the group consisting of vitamins A, D, E and K, a vegetable oil, and about 30% to 50% of a substance suited to reduce the viscosity of said oil and selected from the group consisting of ether, pentan, chloroform and aceton.

11. A therapeutic agent for parenteral administration, comprising a vitamin selected from the group consisting of vitamins A, D, E and K, peanut oil, and about 30% to 50% of a substance suited to reduce the viscosity of said oil and selected from the group consisting of ether, pentan, chloroform and aceton.

12. A therapeutic agent for parenteral administration, comprising a vitamin selected from the group consisting of vitamins A, D, E and K, a vegetable oil, and ether in an amount less than 50% and suited to accelerate the spreading of the mixture after injection to form rapidly a large contact surface between the vitamin containing oil and the tissues, thereby increasing the speed of absorption of the vitamin by said tissues.

13. A therapeutic agent for parenteral administration, comprising a vitamin selected from the group consisting of vitamins A, D, E and K, peanut oil, and ether in an amount less than 50% and suited to accelerate the spreading of the mixture after injection to form rapidly a large contact surface between the vitamin containing oil and the tissues, thereby increasing the speed of absorption of the vitamin by said tissues.

14. A therapeutic agent for parenteral administration, comprising a vitamin selected from the group consisting of vitamins A, D, E and K, a vegetable oil and from 30% to 50% of ether.

15. A therapeutic agent for parenteral administration, comprising a vitamin selected from the group consisting of vitamins A, D, E and K, peanut oil and from 30% to 50% of ether.

HERMANN VOLLMER.